Figure 1:
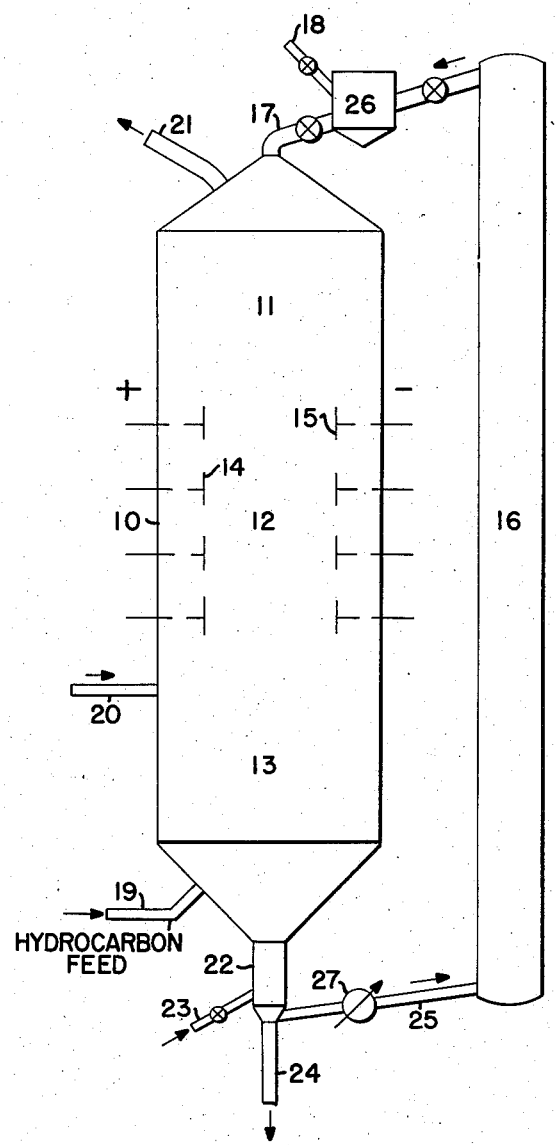

May 2, 1961  C. E. JAHNIG ET AL  2,982,622
HYDROCARBON CONVERSION PROCESS
Filed Sept. 2, 1958  3 Sheets-Sheet 1

Charles E. Jahnig
Peter L. Silveston   Inventors
Charles W. Tyson

By *George J. Silbury*  Attorney

May 2, 1961   C. E. JAHNIG ET AL   2,982,622
HYDROCARBON CONVERSION PROCESS

Filed Sept. 2, 1958   3 Sheets-Sheet 3

Charles E. Jahnig
Peter L. Silveston   Inventors
Charles W. Tyson

By *Berry J Silhany*   Attorney

United States Patent Office 2,982,622
Patented May 2, 1961

2,982,622
HYDROCARBON CONVERSION PROCESS

Charles E. Jahnig, Rumson, Peter L. Silveston, Elizabeth, and Charles W. Tyson, Summit, N.J., assignors to Esso Research and Engineering Company, a corporation of Delaware Filed Sept. 2, 1958, Ser. No. 758,498

15 Claims. (Cl. 23—212)

The present invention is concerned with more effectively subjecting hydrocarbons to high temperature conversions. More particularly, it deals with converting feed stock into light products and high-grade coke by contact with an electrically heated, dense mass of solid particles.

Numerous methods for converting petroleum fractions into light gasiform products, e.g., hydrogen, have been advanced in the art. While, for example, the breakdown of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

The present invention teaches a method of subjecting hydrocarbon feed to high temperature conversion, e.g. 1800–3000° F., in areas where the cost of electric power is relatively cheap, e.g., 6–7 mils/kwh. The system employed is characterized by a high degree of flexibility and stability as well as low investment and operating expense. In accordance with the present invention, hydrocarbon feed stocks are contacted with an electrically heated, dense bed of solids maintained at a reaction temperature. The solids are heated by a controlled electrical potential or voltage applied across one or more portions of the solids bed, the resistance of the solids to electrical flow resulting in their being heated to desired temperatures. The magnitude of the electrical potential or voltage is normally within the range of .1 to 1000 volts/inch, preferably 3–10 volts/inch, and is controlled to cause resistance heating of the solids without resulting in electrical spark discharges within the solids mass.

It is to be clearly noted that the hot, bed solids themselves, and not electrical spark discharges, serve as the active reaction sites. The hydrocarbon feed upon contact with the thus heated solids is converted into light vapors, e.g., $H_2$, and carbon which deposits on the bed solids. Both the vapors and the carbon-coated solids are recovered as products, the latter normally being a high quality electrode grade coke material.

Preferably, a high degree of thermal efficiency is maintained by utilizing a circulating stream of particles to preheat the hydrocarbon feed and to cool the vaporous effluents of the reaction zone while being preheated themselves for subsequent heat exchange. The energy requirement for the process is thus reduced to essentially that required by the basic thermodynamic relationship between feed and products.

In one embodiment of the present invention, it has been found that there exists a small range of particle recycle rate per unit of hydrogen production which offers minimum energy requirements for the over-all conversion system. It has been unexpectedly found that solids recycle rate may be allowed to vary within this range, i.e., 42 to 56 lbs. per thousand cubic feet of product hydrogen, without increasing the energy requirements of the system from its minimum value.

It is to be emphasized that since the present invention utilizes solids heated by their electrical resistance rather than spark discharges as the active sites of reaction numerous advantages are secured. The present process may operate in any dense solids phase whereas "spark reactions" require specific solids density conditions, generally set by a particular range of fluidizing gas velocities. Voltages used in the present process are considerably lower than the 3000–4000 volts/inch employed in "spark conversions," thus resulting in lower energy requirements. Additionally, carefully controlled current distribution, an essential element and distinct problem of a spark discharge system is of relatively little importance in the present process, thus making for greater simplicity of operation. Since gasiform reactants and products serve to uniformly distribute heat to the bed solids which are the centers of reaction, current distribution offers few difficulties.

The solids employed are generally inert, coke or coal particles being particularly preferred when a high valued solid product is desired. In some operations, two types of particles may be employed. Carbonaceous solids may be utilized in the reaction zone, and a circulating stream of heat carrier, such as metallic or ceramic beads, sand, graphite, etc., used to recover heat from the effluent of the reaction zone, the heat being utilized to preheat the feed to the reaction zone or conversion vessel.

The present system is particularly suited to the processing of gasiform hydrocarbon feeds since such feed materials may be readily heat exchanged with the reaction solids. However, liquid feed materials, e.g., naphtha, may be employed by suitable modification of the heat exhanging steps.

The various aspects of the present invention will be made more clearly apparent by reference to the following description, examples and accompanying drawings.

Figure 1 depicts a single vessel system for converting hydrocarbons by the use of an electrically heated moving bed of solids.

Figure 2:
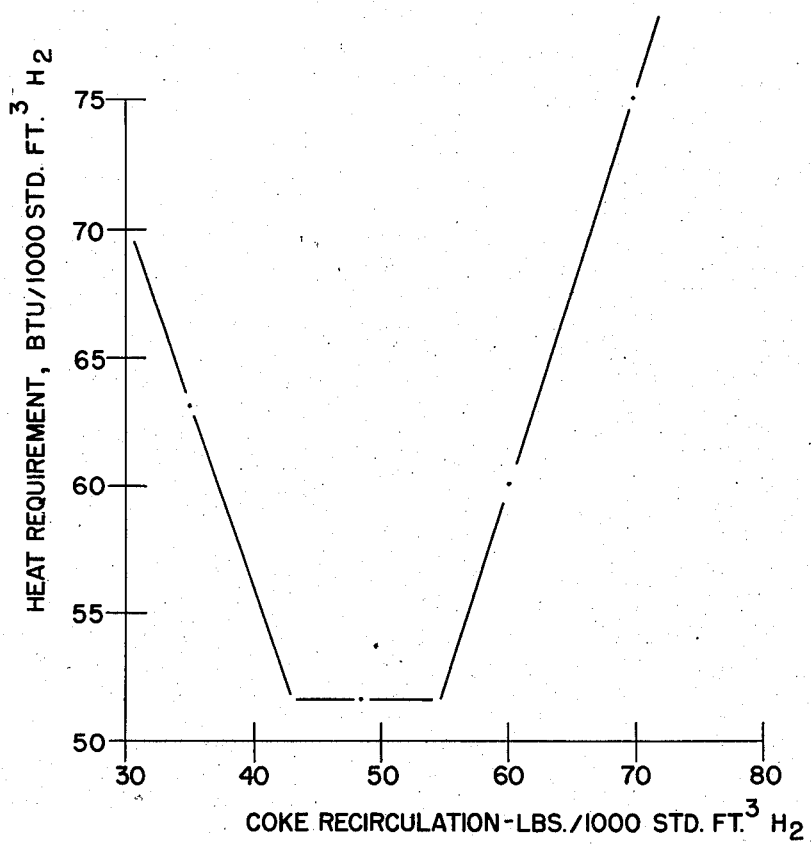

Figure 2 delineates the unexpected relationship between solids recycle rate and energy requirements of the overall system.

Figure 3:
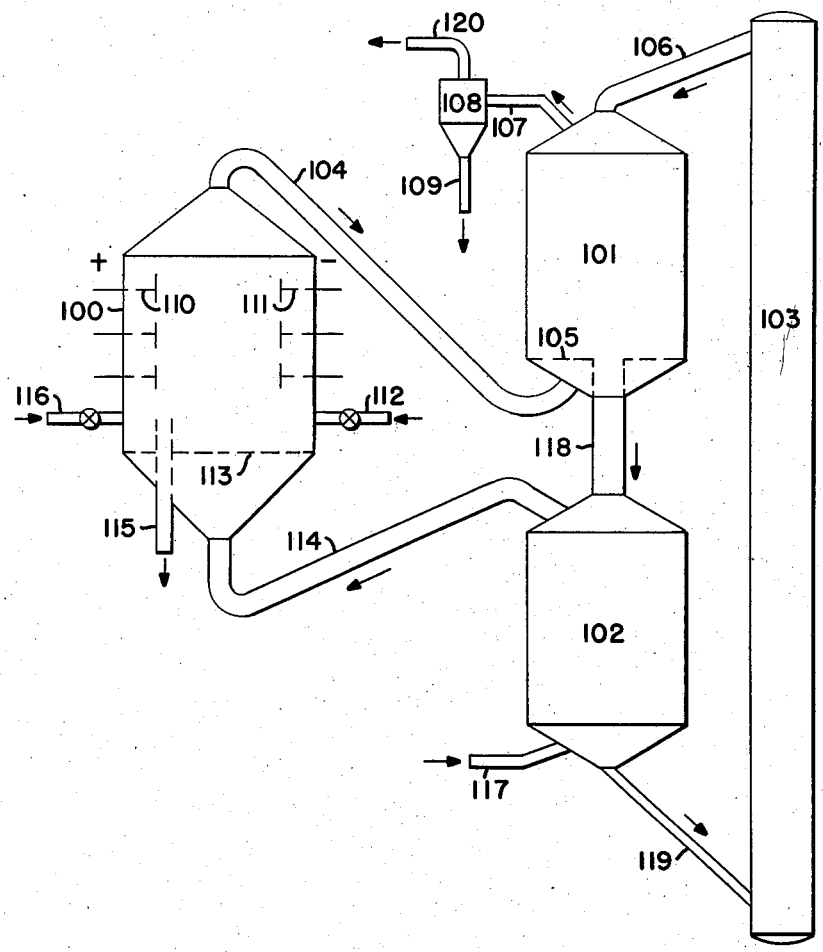

Figure 3 illustrates a multi-vessel system.

Turning to Figure 1, there is shown a relatively simple system, both in cost and ease of operation, for converting hydrocarbon feeds at high temperature. Principal vessel 10 consists of three major zones: solids preheatgas product quenching zone 11, thermal cracking zone 12, and hydrocarbon preheat-solids product quenching zone 13. Vessel 10 is an elongated unit having a diameter of 10 feet and length of 32 feet, 10 feet of which makes up reaction zone 12. Zones 11 and 13 are 7 feet and 15 feet long, respectively. The length of the reaction zone (and thus the reaction time) is determined by the arrangement of the electrodes. In the example described, electrode pairs are spaced every one to two feet along the reaction zone. While a horizontally spaced relationship is shown, the electrodes may be longitudinally positioned with respect to vessel 10. An electric potential is impressed across the electrode pairs. For convenience, the positive and negative electrodes are designated 14 and 15, respectively. The potential or impressed voltage may arise from an A.C. or D.C. source, a transformer or the like being used to step up or step down the source voltage, if necessary.

Within vessel 10, a relatively compact mass of coke particles is passed downwardly through zones 11, 12 and 13. The solids are maintained in the form of a dense, moving bed having a density in the range of 40 to 75, e.g., 64 lbs./ft.$^3$. The coke generally ranges from about 0.05 to 1.0 inch in size, the bulk of the solids being approximately 0.25 of an inch in diameter.

The solids are introduced into the upper portion of unit 10, as will later be further described, and pass downwardly through zone 11 into zone 12 at an over-all rate of 9–10 ft./hr., in the form of a gravitationally flowing fixed bed. In zone 11, the relatively cool solids undergo heat exchange with the hot upflowing gaseous products of reaction zone 12, the solids thus being heated to a temperature of about 2050° F. while cooling the vapors to a temperature of about 130° F.

In the example described, it is desired to convert methane to hydrogen and high quality coke. The methane may be either in the form of natural gas or refinery tail gas. The feed gas is normally scrubbed prior to reaction, by means not shown, to remove $H_2S$ and $CO_2$ which might contaminate the hydrogen product stream. Additionally, minimization of sulfur in the feed stock will give a higher quality coke product.

Assuming it is desired to produce about 20 million standard cubic feed of $H_2$ per day, approximately 10.5 million standard cubic feet of methane per day are introduced through line 19 into the lower portion of vessel 10, i.e., zone 13. Vessel 10 operates at a pressure of about 65 p.s.i.g. The methane, initially at ambient temperature, is preheated to a temperature of 1700–1800° F. by contact with the hot solids leaving reaction zone 12. A small amount of cracking takes place in this zone.

Within thermal cracking zone 12, a voltage is impressed across the electrode pairs and the moving solids bed flowing between them. The potential applied is such as to cause heating of the solids due to their resistance (coke having a resistance to the flow of electricity of about 0.03 ohm/in.$^3$), without causing appreciable electrical spark discharges through the reaction vessel. When using carbonaceous matter as the contact solids, a voltage of about 3 to 10 volts/inch is preferably employed to raise the temperature of the solids to about 1900 to 2500° F. The electrical potential utilized will vary with conductivity of the solid, the cracking desired per unit volume, the reaction temperature, etc. Broadly, it will range from about 0.1 to no more than 1000 volts/inch.

In the examples described, the reaction zone operates at 2150° F., a voltage of 3.2 volts/inch being applied between electrodes. Approximately 30 kwh. per 1000 standard cubic feet of methane feed is consumed as the methane is converted to a high yield of $H_2$. Contact time in zone 12 is about 2–3 seconds and the conversion is 95%, producing a gas stream containing 97.5% hydrogen. Due to the high thermal efficiency of the process, the above energy requirement is to be compared with the figure of 24 kwh. theoretically required for the same degree of conversion of 1000 cubic feet of methane.

As the methane is pyrolized to hydrogen by contact with the thus heated moving coke bed, carbonaceous matter is simultaneously being deposited on the contact particles. Since it is normally desired to use coke produced by the process as the contact solids, the ultimate solid product of the process is a large homogeneous coke particle suitable for electrode manufacture. It normally will have a resistivity of 0.030–0.036 ohm/in.; particle density of 110 lbs./ft.$^3$ and an X-ray diffraction pattern similar to fluid coke.

Carbon is continuously laid down on the contact solids. In order that a relatively constant size distribution be preserved, a portion of the circulating solids is normally subjected to size reduction and/or replacement with freshly added, relatively smaller "seed" particles. Solids size reduction is conveniently done in section 22 of vessel 10 by the use of jets introduced through one or more lines 23. The grinding gas may be hydrogen or methane. Alternatively, size reduction may be accomplished in a distinct vessel by numerous means, e.g., impact against a target, well known to those skilled in the art of solids size reduction.

Coke particles are withdrawn by line 24 as product. Of course, coke product may be removed from other parts of the system. The coke is a high-grade carbon finding use as electrodes in metallurgical industry and as raw material in calcium carbide or phosphorus manufacture.

It is highly preferred to recirculate the relatively cool (600° to 900° F.) coke particles withdrawn from the lower portion 22 of the conversion vessel in the manner hereafter described, the most effective utilization of process heat thereby being realized.

Approximately 75 to 80% of the solids passing through the reaction zone are ultimately circulated to gas product cooling zone 11. The solids are passed by line 25 from section 22 to lift 16 wherefrom they may be returned to the upper portion of unit 10. Unit 16 is preferably a pressurized bucket lift, although a screw or piston feeder or the like may be alternatively employed.

The solids, which have been cooled by heat exchange with the methane feed in zone 13, are thus circulated to product gas cooling zone 11 by line 17. The cool solids quench product gases while being preheated for flow into the reaction zone wherein they serve as reaction sites. It is usually advantageous to position a small storage hopper 26 in line 17 for smoothing out solids flow to the conversion vessel. Conduit 18 serves as a means of adding fresh solids to the stream passing to vessel 10, as well as a convenient means of altering solids flow rates by withdrawing a portion of the circulating solids.

The circulating coke particles may be distributed across the cross section of the various treating zones by numerous means, not shown, such as a grid member. Uniform flow may be maintained in the vessel with the help of similar members.

Generally, it is desirable to employ cooler 27 for treating the coke being passed to zone 11. This may be a simple water spray. While the cooler is shown as positioned in line 25, it may be placed in other portions of the recycle circuit. Additional cooling of the recycle solids is particularly desired where the hydrogen product gas is to be compressed. Though less desired, the cooling step may be omitted.

It would, at first examination, be reasonable to expect that the over-all efficiency (energy consumption) of the system might vary with the solids rate through the moving bed reaction zone (essentially the solids recycle rate). However, it has now been surprisingly found that there is a range of solids rate not only in which a minimum energy consumption is to be found, but over which the solids rate may vary while still giving the same minimum heat requirement.

Generally speaking, the optimum solids rate may be calculated from over-all heat balances and balances across the preheat and heat recovery zones at a fixed reaction temperature. If the solids rate is too low, the feed is not sufficiently preheated; while if it is too large, the solids passed to zone 12 are not sufficiently preheated.

Unexpectedly, there is more than one point of maximum efficiency but rather a definite continuous range of solids rates within which energy requirements are maintained at a minimum. This is illustrated in Figure 2, the pertinent plotted points of which are indicated in the following table. The solid particles are coke, both the initial methane feed and the recycled solids being maintained at ambient temperatures. The reaction zone is at a temperature of about 2100°–2200° F. Relatively long contact times are employed.

Table 1

| Coke Rate, Lbs./Thousand Cubic Feet of Hydrogen Product | Energy Requirement, B.t.u./Thousand Cubic Feet of Hydrogen Product | Percent Increase |
| --- | --- | --- |
| 35 | 63,100 | 22 |
| 42.6 | 51,600 | |
| 48 | 51,600 | |
| 54.5 | 51,600 | |
| 60 | 59,800 | 16 |
| 70 | 75,000 | 45 |

As seen from the above table and the graph of Figure 2, coke rate may be varied over a definite range, i.e., about 42 to 56 lbs./thousand standard cubic feet of hydrogen, while still preserving optimum thermal efficiency.

Thus, the present system is particularly advantageous in that moderate fluctuations in flow do not reduce efficiency and local variation in feed and coke flow rate over the cross-section of the contact vessel are not very serious. Optimum conditions are therefore readily obtained.

Tabulated in Table 2 is a compilation of pertinent data with respect to the over-all system described above.

Table 2

| | Broad Range | Preferred Range |
| --- | --- | --- |
| Reaction Temperature, °F | 1,800–3,000 | 1,900–2,500 |
| Solids Rate, lbs./thousand ft.³ of Hydrogen | 35–70 | 42–56 |
| Voltage Across Electrodes, volts/in | 0.1–1,000 | 3–10 |
| Reaction Residence Time of Gas, sec | 0.5–20 | 2–5 |
| Solids Size, Inches | 0.05–1.0 | .18–.4 |

Numerous modifications may be made to the system heretofore discussed. A portion of the hot gaseous product, e.g., hydrogen, may be recycled to serve to heat the incoming feed. This is particularly desirable when the feed is a liquid, the hydrogen serving as a vaporizing medium. Further, additional feed inlets such as conduit 20 may be employed for controlling the degree of feed preheat as well as permitting the use of one or more types of feed materials to be employed. Thus, both liquid and gaseous feeds may be simultaneously processed. Another modification of the present invention includes a high temperature soaking zone which treats the coke product of the primary cracking zone to improve its electrical and mechanical properties. Though not normally desired, the system may be altered so that downflowing feed contacts upwardly moving solids, a screw or piston feeder replacing the bucket lift previously described. As will be further detailed below, several distinct vessels may be employed for the various heat treating steps.

The use of a moving bed of solids passing through the reaction zone is advantageous in that it permits relatively high gas velocities to be employed as well as not requiring fine solids. There is no problem of recovery of entrained fines, and there is little or no difficulty due to maintenance of requisite solids size distribution.

Though generally less desired, the present invention may utilize a relatively dense fluidized bed in one or more of the treating zones. Figure 3 is specifically directed to such a system.

Illustrated therein is a process carried out principally in reactor 100 and heat exchanging zones 101 and 102. Basically, the system depicted is the same as that of Figure 1, i.e., temperatures, voltages, etc. For the sake of brevity, features common to both systems will not be discussed in detail. Suffice to note that electrodes 110 and 111 impress a voltage potential across the solids mass, vessel 100 sufficient to raise their temperature to reaction levels, e.g., 2200°–2400° F.

The process of Figure 3 is distinctive in that within reactor 100 solids are maintained in the form of a relatively dense fluidized bed, e.g., at a density of 40 to 60 lbs./ft.³. Fluidizing gas, such as hydrocarbons (methane), hydrogen, or an inert gas stream, etc., is introduced by line 112. The gas may be introduced at high velocities so as to grind the solids, i.e., coke, and thus preserve a particle size distribution suitable for fluidizing. Solids size control may alternately be maintained in numerous other ways, e.g., external attrition, well known to those skilled in the art. The bed consists of solids of about 20 to 100 mesh size. Feed, such as methane or a vaporizable hydrocarbon, is introduced into zone 102 by line 117 and preheated therein up to reaction temperatures, the preheated gaseous feed stream passing through line 114 into reactor 100. Grid 113 supports the solids mass in vessel 100 as well as distributing feed gas. Line 116 serves as an alternate means of introducing feed to the reaction zone.

Preheating as well as heat recovery is effected by circulating a mass of relatively coarse solids between vessels 101 and 102 through passageway 118. The solids in vessel 101 recover heat from the product gases evolved in the reactor and give up their recovered heat to feed material in vessel 102. Grid 105 serves to distribute reaction gases across the volume of the heat recovery zone. Relatively cool solids are withdrawn from the preheater through line 119 and recirculated to the heat recovery zone 101 by lift 103 and conduit 106 in essentially the same manner as described relative to Figure 1. Generally, moving bed conditions are employed in zones 101 and 102 in order to obtain countercurrent heat exchange.

High-grade coke product is withdrawn from the reactor through outlet 115. The product may be recovered directly or further serve to supply heat to the various flowing gas streams.

Generally, a certain amount of fines solids will be entrained with the product gases of reactor 100. Due to the large particle size difference between the entrained fines and the heat carrier-solids in zone 101 (about 0.25 inch in size), the fine particles similarly pass through vessel 101 along with the gaseous product stream. The product stream is recovered overhead through line 107, cyclone 108 serving to remove fines. The fines are recovered through line 109 and may be passed to the reaction zone or otherwise employed. Product gas is recovered through line 120 and passed to conventional purification, i.e., water scrubbing and compression. Since it is not necessary to remove fines from high temperature gases but rather from the cooled gasiform effluent of zone 101, substantial savings in the size of solids separation facilities and in materials of construction are realized since the volume of the gases to be treated is considerably less, and at a much lower temperature.

Of course numerous other ways of modifying the above systems will suggest themselves to those skilled in the art of both high temperature reaction and solids handling.

Summarily, the present invention offers the following advantages over processes heretofore known in the art:

(1) Effective operation over a wide range of bed densities and under both moving and fluidized bed conditions. Since the solids, rather than spark discharges, are the sites of reaction, any dense solids phase may be employed.

(2) Lower electrode voltages are required as compared with "arc" processes. Thus, power handling costs may be reduced by an optimum balance between insulating for high voltage and the stepdown of high voltage power supply.

(3) Virtually complete heat recovery is obtained by the use of circulating solids for product heat recovery and feed preheat. The energy requirement is reduced to close to the heat of formation of the feed material at the reaction temperature.

(4) Flexible operation of capacity since bed density is not critical thus permitting a wide range of gas (feed) velocities to be employed.

(5) Simple recovery of fine particles.

(6) High purity product streams. Coke product is agglomerated in process to desirable size for electrode manufacture.

Having described the invention, that which is claimed is set forth in the appended claims.

What is claimed is:

1. A method for producing hydrogen and high quality coke which comprises passing inert solid particles as a relatively dense mass downwardly through an elongated reaction zone, applying an electrical voltage of 0.1 to 1000 volts per inch across at least a portion of said solids mass in said reaction zone, said voltage being sufficient to raise the temperature of said solids to 1800 to 3000° F. due to their resistance to the flow of electricity without causing substantial electrical spark discharges through said solids mass, downwardly withdrawing thus heated solids from said reaction zone, preheating a hydrocarbon feed by heat exchange with said withdrawn solids and introducing said preheated feed into and upwardly through said reaction zone in the form of an upwardly moving gasiform stream, said feed contacting said heated solids and being converted to light vapors including a substantial portion of hydrogen and carbon which deposits on said solids, heat exchanging hot vapors withdrawn from said reaction zone with inert solids in a heating zone, circulating at least a portion of the solids withdrawn from the reaction zone and previously heat exchanged with said feed to said heating zone, passing solids from said heating zone to said reaction zone as solids feed thereto, and recovering at least a portion of the solids withdrawn from the reaction zone as product and recovering hydrogen gas and light vapors from the upper portion of said reaction zone.

2. The method of claim 1 wherein said solids mass is a moving bed of coke particles.

3. The method of claim 1 wherein at least a portion of the solids withdrawn from said reaction zone is subjected to size reduction.

4. The method of claim 2 wherein the rate of recycling of coke to the reaction zone is maintained in the range of about 42 to 56 pounds per thousand cubic feet of hydrogen gas withdrawn as product whereby requisite energy for the system is kept at a minimum.

5. A method for producing hydrogen and high quality coke which comprises passing solid coke particles as a compact dense mass downwardly through an elongated reaction zone, applying an electrical voltage of between about 0.1 and 1000 volts per inch across said downwardly moving solids mass in the central portion of said reaction zone, said voltage being sufficient to raise the temperature of said solids to between about 1800° and 3000° F. due to their resistance to the flow of electricity without causing substantial electrical spark discharges through said solids mass, downwardly withdrawing thus heated coke solids from said central portion of said solids mass into the lower portion of said reaction zone, preheating a hydrocarbon feed by heat exchange with said downwardly moving withdrawn solids in the lower portion of said reaction zone and passing said preheated hydrocarbon feed into and upwardly through said central portion of said solids mass in said reaction zone in the form of an upwardly moving gasiform stream, said hydrocarbon feed contacting said highly heated solids and being converted to light gasiform material including a substantial portion of hydrogen and carbon which deposits on said solids, heat exchanging hot gasiform material passing upwardly from said central portion in said reaction zone with downwardly moving coke solids in a heating zone arranged in the upper portion of said reaction zone, circulating at least a portion of said coke solids withdrawn from the lower portion of said reaction zone and previously heat exchanged with said hydrocarbon feed to the upper portion of said heating zone, passing coke solids from said heating zone downwardly to said central portion of said reaction zone as solids feed thereto, recovering at least a portion of the coke solids withdrawn from the lower portion of said reaction zone as product, and recovering light gasiform material including hydrogen gas from the upper portion of said reaction zone.

6. A method for producing hydrogen and high quality coke which comprises passing solid coke particles as a compact dense mass downwardly through an elongated reaction zone, applying an electrical voltage across a central portion of said downwardly moving solids mass in said reaction zone, said voltage being sufficient to raise the temperature of said coke solids to between about 1900° F. and 3000° F. due to their resistance to the flow of electricity without causing substantial electrical spark discharges through said solids mass, downwardly withdrawing thus heated coke solids from said central portion of said solids mass into the lower portion of said reaction zone, preheating a normally gaseous hydrocarbon feed by heat exchange with said downwardly moving withdrawn solids in the lower portion of said reaction zone and passing said preheated hydrocarbon feed into and upwardly through said central portion of said solids mass in said reaction zone in the form of an upwardly moving gasiform stream, said hydrocarbon feed contacting said highly heated solids and being converted to substantially only hydrogen and carbon which deposits on said solids, heat exchanging hot gasiform material passing upwardly from said central portion into and through said reaction zone for contact with downwardly moving coke solids in a heating zone arranged in the upper portion of said reaction zone, circulating at least a portion of said coke solids withdrawn from the lower portion of said reaction zone and previously heat exchanged with said gaseous hydrocarbon feed to the upper portion of said heating zone, passing coke solids from said heating zone downwardly to said central portion of said reaction zone as solids feed thereto, recovering at least a portion of the coke solids withdrawn from the lower portion of said reaction zone as product, and recovering hydrogen gas from the upper portion of said reaction zone.

7. A method for producing hydrogen and high quality coke which comprises passing solid inert particles as a compact dense mass downwardly through an elongated reaction zone, heating a central portion of said downwardly moving dense mass to a temperature between about 1900° F. and 3000° F. by applying an electrical voltage across said central portion of said downwardly moving solids mass in said reaction zone, said heating being effected by the resistance of the solids to the flow of electricity, downwardly withdrawing thus heated inert solids from said central portion of said solids mass into the lower portion of said reaction zone, preheating a normally gaseous hydrocarbon feed by heat exchange with said downwardly moving withdrawn solids in the lower portion of said reaction zone and passing said preheated hydrocarbon feed into and upwardly through said central portion of said solids mass in said reaction zone in the form of an upwardly moving gasiform stream, said hydrocarbon feed contacting said highly heated solids and being converted to light gasiform material including a substantially only hydrogen and carbon which deposits on said solids, heat exchanging hot gasiform material passing upwardly from said central portion in said reaction zone with downwardly moving solids in a heating zone arranged in the upper portion of said reaction zone, circulating at least a portion of said solids withdrawn from the lower portion of said reaction zone and previously heat exchanged with said hydrocarbon feed to the upper portion of said heating zone, passing said solids from said heating zone downwardly to said central portion of said reaction zone as solids feed thereto, removing at least a portion of the solids withdrawn from the lower portion of said reaction zone as product, and recovering hydrogen gas from the upper portion of said reaction zone.

8. The method of claim 5 wherein at least a portion of the solids withdrawn from the lower portion of said reaction zone is subjected to size reduction and smaller solids recycled to said reaction zone.

9. The method of claim 5 wherein the rate of recycling of coke to the reaction zone is maintained in the range of about 42 to 56 pounds per thousand cubic feet of hydrogen gas withdrawn as product whereby requisite energy for the process is kept at a minimum.

10. An improved method of converting hydrocarbons at high temperatures into coke and gasiform reaction products including light hydrocarbon vapors and a substantial proportion of hydrogen which comprises introducing substantially inert solid particles into the top portion of a vertically arranged reaction zone and passing them as a compact mass downwardly through said reaction zone in the form of a relatively dense solids mass, applying an electrical voltage across an intermediate portion of said downwardly moving solids mass, said voltage having a magnitude such as to cause heating of said solids to between about 1800° F. and 3000° F. due to their resistance to the flow of electrical current while being of insufficient magnitude to cause substantial spark discharges in said solids mass, passing a stream of suitably preheated hydrocarbon feed upwardly through said reaction zone for contact with the downwardly moving solids mass thus heated to a temperature above about 1800° F., to convert said hydrocarbon feed to coke which deposits on said inert solids and gasiform reaction products including light hydrocarbon vapors and a substantial portion of hydrogen, withdrawing said gasiform reaction products overhead and removing solids from the bottom of said reaction zone, said compact solids mass extending above and below said intermediate electrically heated portion of said solids mass, passing hot gasiform reaction products upwardly from said reaction zone through the upper portion of said downwardly moving mass of solids to cool the gasiform reaction products before withdrawal overhead and to preheat solids moving from the upper portion of said downwardly moving solids mass into said intermediate electrically heated portion.

11. An improved method of converting hydrocarbons at high temperatures into coke and gasiform reaction products including light hydrocarbon vapors and a substantial proportion of hydrogen which comprises introducing substantially inert solid particles into the top portion of a vertically arranged reaction zone and passing them as a compact mass downwardly through said reaction zone in the form of a relatively dense solids mass, applying an electrical voltage across an intermediate portion of said downwardly moving solids mass, said voltage having a magnitude such as to cause heating of said solids to between about 1800° F. and 3000° F. due to their resistance to the flow of electrical current while being of insufficient magnitude to cause substantial spark discharges in said solids mass, passing a stream of suitably preheated hydrocarbon feed upwardly through said reaction zone for contact with the downwardly moving solids mass thus heated to a temperature above about 1800° F., to convert said hydrocarbon feed to coke which deposits on said inert solids and gasiform reaction products including light hydrocarbon vapors and a substantial portion of hydrogen, withdrawing said gasiform reaction products overhead and removing solids from the bottom of said reaction zone, said compact solids mass extending above and below said intermediate electrically heated portion of said solids mass, passing hot gasiform reaction products upwardly from said reaction zone through the upper portion of said downwardly moving mass of solids to cool the gasiform reaction products before withdrawal overhead and to preheat solids moving from the upper portion of said downwardly moving solids mass into said intermediate electrically heated portion, and passing hydrocarbon feed upwardly through the lower portion of said downwardly moving solids mass to preheat the hydrocarbon feed before it is passed to said intermediate electrically heated portion of said solids mass and to cool inert solids before removing them from the bottom portion of said downwardly moving solids mass.

12. An improved method of converting hydrocarbons at high temperatures into coke and gasiform reaction products including light hydrocarbon vapors and a substantial proportion of hydrogen which comprises introducing solid coke particles into the top portion of a vertically arranged reaction zone and passing them as a compact mass downwardly through said reaction zone in the form of a relatively dense solids mass, applying an electrical voltage across an intermediate portion of said downwardly moving solids mass, said voltage having a magnitude such as to cause heating of said solids to between about 1800° F. and 3000° F. due to their resistance to the flow of electrical current while being of insufficient magnitude to cause substantial spark discharges in said solids mass, passing a stream of preheated hydrocarbon feed upwardly through said reaction zone for contact with the downwardly moving solids mass thus heated to a temperature above about 1800° F., to convert said hydrocarbon feed to coke which deposits on said coke solids and gasiform reaction products including light hydrocarbon vapors and a substantial portion of hydrogen, passing hot gasiform reaction products upwardly from said reaction zone to a coke solids preheating zone above said reaction zone for heat exchange with said coke solids, said coke solids preheating zone forming part of said downwardly moving coke solids mass, withdrawing said gasiform reaction products overhead and removing coke solids from the bottom of said reaction zone.

13. A method according to claim 11 wherein at least a portion of said solids withdrawn from the bottom portion of said downwardly moving solids mass and previously heat exchanged with said hydrocarbon feed are circulated to the top portion of said downwardly moving solids mass above said intermediate electrically heated section.

14. A method according to claim 12 wherein the hydrocarbon feed is a normally gaseous hydrocarbon and the gasiform reaction products consist essentially of hydrogen which is recovered from the top of said downwardly moving solids mass and high quality coke is removed as product from the bottom portion of said downwardly moving solids mass.

15. An improved method of converting hydrocarbons at high temperatures into coke and gasiform reaction products including light hydrocarbon vapors and a substantial proportion of hydrogen which comprises introducing substantially inert solid particles into the top portion of a vertically arranged reaction zone and passing them as a compact mass downwardly through said reaction zone in the form of a relatively dense solids mass, preheating said solids by contact with hot gasiform reaction products from said reaction zone, applying an electrical voltage across an intermediate portion of said downwardly moving solids mass, said voltage having a magnitude such as to cause heating of said solids to between about 1800° F. and 3000° F. due to their resistance to the flow of electrical current while being of insufficient magnitude to cause substantial spark discharges in said solids mass, passing a stream of preheated hydrocarbon feed upwardly through said reaction zone for contact with the downwardly moving solids mass thus heated to a temperature above about 1800° F. to convert said hydrocarbon feed to coke which deposits on said inert solids and gasiform reaction products including light hydrocarbon vapors and a substantial portion of hydrogen, preheating said hydrocarbon feed by heat exchange with hot solids withdrawn from the lower portion of said reaction zone, withdrawing said gasiform reaction products overhead and removing solids from the bottom of said reaction zone.

(References on following page)

References Cited in the file of this patent

UNITED STATES PATENTS

| | | | |
|---|---|---|---|
| 1,199,220 | Szarvasy | Sept. 26, | 1916 |
| 1,352,086 | Rose | Sept. 7, | 1920 |
| 1,853,688 | Leffer | Apr. 12, | 1932 |
| 2,389,636 | Ramseyer | Nov. 27, | 1945 |
| 2,600,078 | Schutte et al. | June 10, | 1952 |
| 2,698,777 | Hartwick et al. | Jan. 4, | 1955 |
| 2,799,640 | Pevere et al. | July 16, | 1957 |